US010002560B2

(12) United States Patent
Zheng et al.

(10) Patent No.: US 10,002,560 B2
(45) Date of Patent: Jun. 19, 2018

(54) GATE DRIVE ON ARRAY UNIT, GATE DRIVE ON ARRAY CIRCUIT AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Yi Zheng, Beijing (CN); Zhiyong Wang, Beijing (CN); Zhengxin Zhang, Beijing (CN); Yao Yu, Beijing (CN); Lingyun Shi, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 321 days.

(21) Appl. No.: 14/388,500

(22) PCT Filed: Dec. 5, 2013

(86) PCT No.: PCT/CN2013/088684
§ 371 (c)(1),
(2) Date: Sep. 26, 2014

(87) PCT Pub. No.: WO2015/024329
PCT Pub. Date: Feb. 26, 2015

(65) Prior Publication Data
US 2016/0293095 A1 Oct. 6, 2016

(30) Foreign Application Priority Data
Aug. 22, 2013 (CN) .......................... 2013 1 0370143

(51) Int. Cl.
*G09G 3/36* (2006.01)
*G06F 3/038* (2013.01)
(Continued)

(52) U.S. Cl.
CPC ............. *G09G 3/2096* (2013.01); *G09G 3/20* (2013.01); *G09G 3/3266* (2013.01);
(Continued)

(58) Field of Classification Search
CPC ............... G09G 3/3266; G09G 3/3275; G09G 3/3674–3/3692; G09G 2300/0408;
(Continued)

(56) References Cited

U.S. PATENT DOCUMENTS 6,970,530 B1 * 11/2005 Wang .................. G11C 19/282
345/100
8,049,703 B2 11/2011 Chang et al.
(Continued)

FOREIGN PATENT DOCUMENTS

CN 1832171 A 9/2006
CN 102509533 A 6/2012
(Continued)

OTHER PUBLICATIONS

International Search Report dated May 20, 2014 (PCT/CN2013/088684); ISA/CN.
(Continued)

*Primary Examiner* — Roberto Flores

(57) ABSTRACT

A gate drive on array unit, a gate drive on array circuit and a display device are disclosed. The gate drive on array unit including: a control module configured to output a clock signal under control of a gate driving signal of a previous stage of gate drive on array unit or a start input signal; an output module connected to the control module and configured to output a high voltage signal (VGH) as a gate driving signal of the present stage under control of the clock signal outputted from the control module, and output a low voltage signal under the control of the clock signal outputted from the control module; and a reset module connected to the
(Continued)

output module, and configured to reset the gate driving signal of the present stage under the control of a gate driving signal of a next stage of gate drive on array unit.

7 Claims, 6 Drawing Sheets

(51) Int. Cl.
*G09G 3/20* (2006.01)
*G09G 3/3266* (2016.01)

(52) U.S. Cl.
CPC ... *G09G 3/3688* (2013.01); *G09G 2300/0408* (2013.01); *G09G 2310/0267* (2013.01)

(58) Field of Classification Search
CPC ... G09G 2310/0286; G09G 2310/0289; G09G 2310/0264–2310/0275; G11C 19/00–19/38; G11C 27/04; G11C 29/20
See application file for complete search history.

(56) References Cited

U.S. PATENT DOCUMENTS

| | | | | |
|---|---|---|---|---|
| 8,576,187 | B2 | 11/2013 | Lin et al. | |
| 9,330,782 | B2 * | 5/2016 | Yamamoto | G11C 19/28 |
| 2003/0012330 | A1 * | 1/2003 | Osame | G11C 19/28 377/2 |
| 2003/0227433 | A1 * | 12/2003 | Moon | G09G 3/3677 345/100 |
| 2004/0189584 | A1 * | 9/2004 | Moon | G09G 3/20 345/100 |
| 2004/0234020 | A1 * | 11/2004 | Yu | G11C 19/28 377/64 |
| 2006/0214901 | A1 * | 9/2006 | Nagatsuka | G09G 3/3291 345/100 |
| 2007/0001953 | A1 * | 1/2007 | Jang | G09G 3/3607 345/88 |
| 2007/0171172 | A1 | 7/2007 | Chang et al. | |
| 2008/0123799 | A1 * | 5/2008 | Otose | G11C 19/28 377/68 |
| 2009/0121998 | A1 * | 5/2009 | Ohkawa | G09G 3/3688 345/100 |
| 2012/0008731 | A1 * | 1/2012 | Hsu | G11C 19/28 377/79 |
| 2012/0082287 | A1 * | 4/2012 | Moriwaki | H01L 29/78696 377/64 |
| 2012/0113016 | A1 | 5/2012 | Lin et al. | |
| 2012/0182050 | A1 * | 7/2012 | Yang | G09G 3/3266 327/109 |
| 2012/0293401 | A1 * | 11/2012 | Li | G11C 19/184 345/100 |
| 2012/0327060 | A1 * | 12/2012 | Ohhashi | G02F 1/1345 345/211 |
| 2013/0088265 | A1 | 4/2013 | Chen | |
| 2013/0136224 | A1 * | 5/2013 | Qing | G11C 19/28 377/64 |
| 2014/0292628 | A1 * | 10/2014 | Park | G09G 3/3677 345/100 |
| 2014/0313174 | A1 * | 10/2014 | Murakami | G11C 19/28 345/204 |
| 2014/0321599 | A1 * | 10/2014 | Cho | G11C 19/28 377/64 |
| 2015/0279480 | A1 * | 10/2015 | Murakami | G09G 3/20 345/100 |
| 2016/0224175 | A1 * | 8/2016 | Moon | G06F 3/0412 |

FOREIGN PATENT DOCUMENTS

| | | | |
|---|---|---|---|
| CN | 102522070 | A | 6/2012 |
| CN | 102629444 | A | 8/2012 |
| CN | 102708778 | A | 10/2012 |
| CN | 102708796 | A | 10/2012 |
| CN | 103236273 | A | 8/2013 |
| JP | 200570732 | A | 3/2005 |
| JP | 2011232730 | A | 11/2011 |
| TW | 200729115 | A | 8/2007 |

OTHER PUBLICATIONS

Feb. 23, 2016—International Preliminary Report on Patentability Appn PCT/CN2013/088684.
May 31, 2016—(CN)—First Office Action Appn 201410802581.0 with English Tran.
Jan. 5, 2017—(CN) Second Office Action Appn 201310370143.7 with English Tran.
Jun. 12, 2017—(CN) Third Office Action Appn 201310370143.7 with English Tran.

* cited by examiner

GATE DRIVE ON ARRAY UNIT, GATE DRIVE ON ARRAY CIRCUIT AND DISPLAY APPARATUS

The application is a U.S. National Phase Entry of International Application No. PCT/CN2013/088684, filed on Dec. 5, 2013, designating the United States of America and claiming priority to Chinese Patent Application No. 201310370143.7, filed on Aug. 22, 2013. The present application claims priority to and the benefit of all the above-identified applications and all of the above-identified applications are incorporated by reference herein in their entireties.

FIELD OF THE INVENTION

The present disclosure relates to the field of display technique, and in particular to a gate drive on array (GOA, Gate Drive on Array) unit, a gate drive on array circuit and a display apparatus.

BACKGROUND

GOA technique is a technique that integrates a liquid crystal display gate driving circuit (Gate Driver IC) on an array substrate, having the following advantages: (1) integrating a gate driving circuit on the array substrate enables to effectively reduce production cost and power consumption; (2) saving bonding yield processes enables to upgrade product yield and production capacity; (3) saving gate driving circuit bonding (gate IC bonding) areas enables a display panel to have a symmetrical structure, so as to realize the narrowing of the frame of the display panel.

However, the existing GOA technique adopts a relatively large quantity of thin film transistors (TFT), thereby causing existence of multi-layer overlap in the wiring of the circuit board, so that the following problems may occur: (1) process fluctuation easily leads to a parasitic capacitance coupling change inside the GOA, thereby causing an abnormal output of the gate; (2) due to a great number of crossover points, a relatively large voltage difference exists between the crossover points, which easily causes Electro-Static Discharge (ESD).

SUMMARY

Given that, the present disclosure provides a GOA unit, a GOA circuit and a display device in view of deficiencies existing in the prior art, which are capable of effectively reducing an abnormal output of a gate driving signal due to a multi-layer overlap of wiring and a problem of electrostatic discharge due to existence of a relatively large voltage difference between the crossover points.

Technical solutions of the present disclosure can be realized as follows.

An embodiment of the present disclosure provides a gate drive on array unit, comprising: a control module configured to output a clock signal under control of a gate driving signal of a previous stage of gate drive on array unit or a start input signal; an output module connected to the control module and configured to output a high voltage signal as a gate driving signal of a present stage under control of the clock signal outputted from the control module and output a low voltage signal under the control of the clock signal outputted from the control module; and a reset module connected to the output module and configured to reset the gate driving signal of the present stage under control of a gate driving signal of a next stage of gate drive on array unit.

In the above embodiment, the control module comprises a first thin film transistor, the output module comprises a second thin film transistor and a third thin film transistor, and the reset module comprises a fourth thin film transistor, wherein, a gate of the first thin film transistor is connected to an output terminal of the gate driving signal of the previous stage of gate drive on array unit or the start input signal, a first electrode of the first thin film transistor is connected to a clock signal input terminal, and a second electrode of the first thin film transistor is connected to a gate of the second thin film transistor and a gate of the third thin film transistor respectively;

a first electrode of the second thin film transistor is connected to a high level output terminal, and a second electrode of the second thin film transistor is connected to a second electrode of the third thin film transistor and an output terminal of the gate driving signal of the present stage respectively;

a second electrode of the third thin film transistor is connected to a low level output terminal and a first electrode of the fourth thin film transistor respectively; and a gate of the fourth thin film transistor is connected to an output terminal of the gate driving signal of the next stage of gate drive on array unit, and a second electrode of the fourth thin film transistor is connected to the output terminal of the gate driving signal of the present stage.

In the above embodiment, the first thin film transistor, the second thin film transistor and the fourth thin film transistor of the first stage of gate drive on array unit are N-type thin film transistors; the third thin film transistor is a P-type thin film transistor.

In the above embodiment, except the first stage of gate drive on array unit, the first thin film transistor and the third thin film transistors of the odd stages of gate drive on array units are P-type thin film transistors, and the second thin film transistor and the fourth thin film transistor thereof are N-type thin film transistors;

the first thin film transistor and the second thin film transistors of the even stages of gate drive on array units are P-type thin film transistors; the third thin film transistor and the fourth thin film transistor thereof are N-type thin film transistors.

An embodiment of the present disclosure further provides an gate drive on array circuit comprising more than one of the gate drive on array units as described above;

except first stage of gate drive on array unit, a signal input terminal of each stage of gate drive on array unit is connected to a gate signal output terminal of a previous stage of gate drive on array unit;

except last stage of gate drive on array unit, a reset terminal of each stage of gate drive on array unit is connected to a gate signal output terminal of a next stage of gate drive on array unit.

An embodiment of the present disclosure further provides a display device comprising the gate drive on array circuit as described in the present disclosure.

The GOA unit, GOA circuit and display device provided in the embodiments of the present disclosure have the following beneficial effects:

The GOA unit adopts four thin film transistors, simplifies the original GOA units, and reduces the wiring of the circuit board, thereby effectively reducing the problem of an abnormal output of the gate driving signal due to the multi-layer overlap of the wiring; in addition, due to the reduction of the crossover points, the problem of electro-static discharge due to existence of a relatively large voltage difference between the crossover points is effectively reduced.

DETAILED DESCRIPTION

A further detailed specification will be given below in combination with specific embodiments of the present disclosure.

Figure 1:
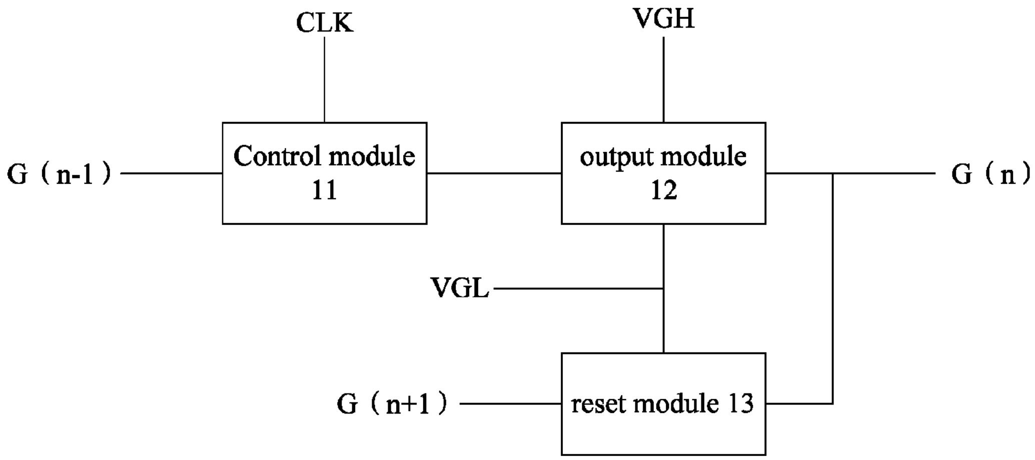
FIG. 1 is a schematic block diagram of a structure of a GOA unit of a first embodiment of the present disclosure.

FIG. 1 is a schematic block diagram of a GOA unit of a first embodiment of the present disclosure. As shown in FIG. 1, the GOA unit comprises a control module 11, an output module 12 and a reset module 13.

In the present embodiment, the control module 11 is connected to the output module 12 and configured to output a clock signal CLK to the output module 12 under the control of a gate driving signal of the previous stage of gate drive on array unit or a start input signal.

The output module 12 is configured to output a high voltage signal VGH as a gate driving signal of a present stage under a control of the clock signal, and output a low voltage signal VGL under the control of the clock signal.

The reset module 13 is connected to a gate driving signal of the next stage of gate drive on array unit and an output terminal of a gate driving signal of the present stage respectively, and configured to reset the gate driving signal of the present stage under a control of a gate driving signal of a next stage of gate drive on array unit.

In FIG. 1, the gate driving signal of the previous stage of gate drive on array unit is G(n−1), the gate driving signal of the present stage of gate drive on array unit is G(n), and the gate driving signal of the next stage of gate drive on array signal is G(n+1).

Figure 2:
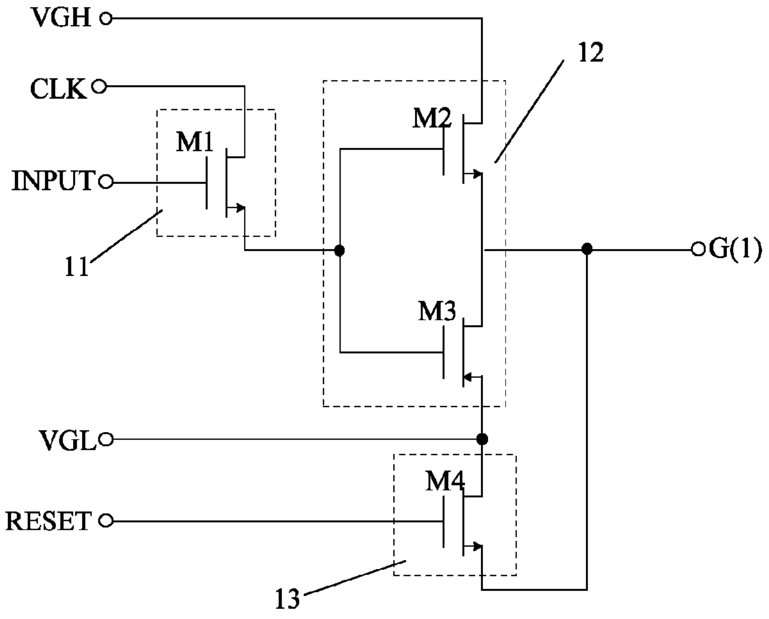
FIG. 2 is a schematic diagram of a circuit of a GOA unit of a second embodiment of the present disclosure.

FIG. 2 is a schematic diagram of a circuit of a GOA unit of a second embodiment of the present disclosure. As shown in FIG. 2, the GOA unit provide in the second embodiment is based on the GOA unit provided in the first embodiment, and is a first stage of GOA unit; in the second embodiment, the control module 11 comprises a first thin film transistor M1, the output module 12 comprises a second thin film transistor M2 and a third thin film transistor M3, and the reset module 13 comprises a fourth thin film transistor M4.

In the present embodiment, a gate of the first thin film transistor M1 is connected to a signal input terminal INPUT, a first electrode of the first thin film transistor M1 is connected to the clock signal input terminal CLK, and a second electrode of the first thin film transistor M1 is connected to a gate of the second thin film transistor M2 and a gate of the third thin film transistor M3 respectively.

A first electrode of the second thin film transistor M2 is connected to a high level signal terminal VGH, and a second electrode of the second thin film transistor M2 is connected to a first electrode of the third thin film transistor M3 and an output terminal G(1) of the gate driving signal of the present stage respectively.

A second electrode of the third thin film transistor M3 is connected to a low level signal terminal VGL and a first electrode of the fourth thin film transistor M4 respectively.

A gate of the fourth thin film transistor M4 is connected to a reset terminal RESET, and a second electrode of the fourth thin film transistor M4 is connected to the output terminal G(1) of the gate driving signal of the present stage.

The reset terminal RESET is connected to the output terminal of the gate driving signal of the next stage of array substrate driving unit, that is, the reset terminal RESET of the first stage of gate drive on array unit is connected to G(2).

As an example, the first thin film transistor, the second thin film transistor and the fourth thin film transistor are N-type thin film transistors; the third thin film transistor is a P-type thin film transistor.

The first electrodes and second electrodes of the thin film transistors in the present embodiment can be sources or drains of the thin film transistors.

Figure 3:
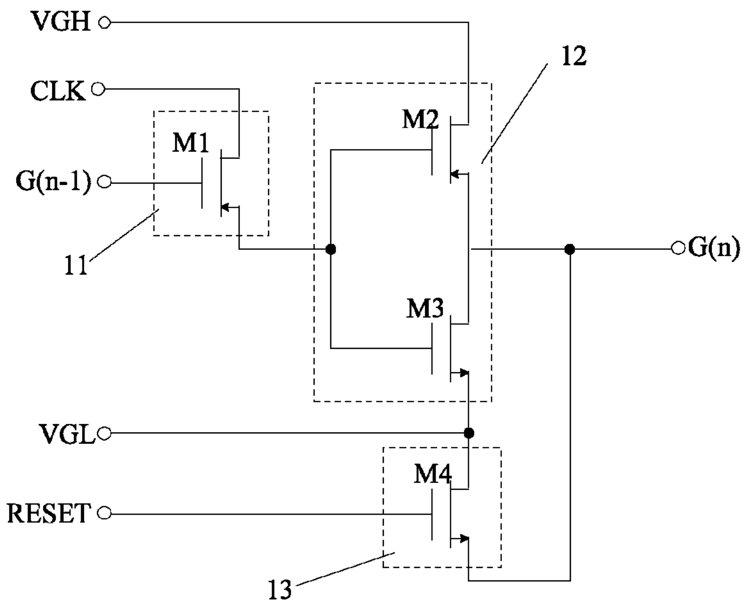
FIG. 3 is a schematic diagram of a circuit of a GOA unit of a third embodiment of the present disclosure.

FIG. 3 is a schematic diagram of a circuit of a GOA unit of the third embodiment of the present disclosure. As shown in FIG. 3, the gate drive on array unit of the third embodiment is based on the GOA unit provided in the first embodiment, and is an even stage of GOA unit. In the third embodiment, the control module 11 comprises the first thin film transistor M1, the output module 12 comprises the second thin film transistor M2 and the third thin film transistor M3, and the reset module 13 comprises the fourth thin film transistor M4.

In the present embodiment, a gate of the first thin film transistor M1 is connected to the output terminal G(n−1) of the gate driving signal of the previous stage of gate drive on array unit, a first electrode of the first thin film transistor M1 is connected to the clock signal input terminal CLK, and a second electrode of the first thin film transistor M1 is connected to a gate of the second thin film transistor M2 and a gate of the third thin film transistor M3.

A first electrode of the second thin film transistor M2 is connected to the high level signal terminal VGH, and a second electrode of the second thin film transistor M2 is connected to a first electrode of the third thin film transistor M3 and an output terminal G(n) of the gate driving signal of the present stage respectively.

A second electrode of the third thin film transistor M3 is connected to the low level signal terminal VGL and a first electrode of the fourth thin film transistor M4 respectively.

A gate of the fourth thin film transistor M4 is connected to the reset terminal RESET, and a second electrode of the fourth thin film transistor M4 is connected to the output terminal G(n) of the gate driving signal of the present stage.

In the present embodiment, the reset terminal RESET is connected to the output terminal of the gate driving signal of the next stage of gate drive on array unit, that is, the reset terminal RESET is connected to G(n+1).

As an example, the first thin film transistor and the second thin film transistor are P-type thin film transistors; the third thin film transistor and the fourth thin film transistor are N-type thin film transistors.

The first electrodes and second electrodes of the thin film transistors in the present embodiment can be sources or drains of the thin film transistors.

Figure 4:
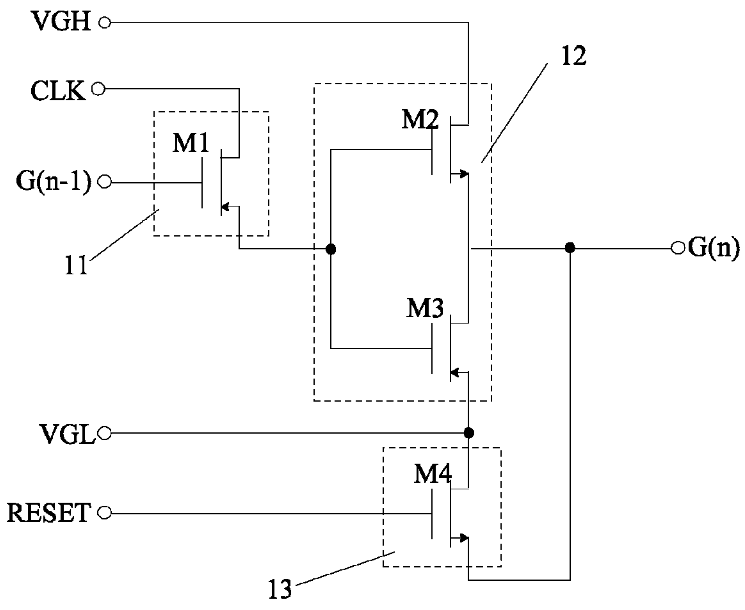
FIG. 4 is a schematic diagram of a circuit of a GOA unit of a fourth embodiment of the present disclosure.

FIG. 4 is a schematic diagram of a circuit of a GOA unit of the fourth embodiment of the present disclosure. As shown in FIG. 4, the GOA unit provided in the fourth embodiment is based on the GOA unit provided in the first embodiment, and is an odd stage of GOA unit except the first stage of GOA unit. In the fourth embodiment, the control module 11 comprises the first thin film transistor M1, the output module 12 comprises the second thin film transistor M2 and the third thin film transistor M3, and the reset module 13 comprises the fourth thin film transistor M4.

In the present embodiment, a gate of the first thin film transistor M1 is connected to the output terminal G(n−1) of the gate driving signal the previous stage of gate drive on array unit; a first electrode of the first thin film transistor M1 is connected to the clock signal input terminal CLK, and a second electrode of the first thin film transistor M1 is connected to a gate of the second thin film transistor M2 and a gate of the third thin film transistor M3.

A first electrode of the second thin film transistor M2 is connected to the high level signal terminal VGH, and a second electrode of the second thin film transistor M2 is connected to a first electrode of the third thin film transistor M3 and an output terminal G(n) of the gate driving signal of the present stage respectively.

A second electrode of the third thin film transistor M3 is connected to the low level signal terminal VGL and a first electrode of the fourth thin film transistor M4 respectively.

A gate of the fourth thin film transistor M4 is connected to the reset terminal RESET, and a second electrode of the fourth thin film transistor M4 is connected to the output terminal G(n) of the gate driving signal of the present stage.

The reset terminal RESET is connected to the output terminal of the gate driving signal of the next stage of gate drive on array unit, that is, the reset terminal RESET is connected to G(n+1).

As an example, the first thin film transistor M1 and the third thin film transistor M3 are P-type thin film transistors; the second thin film transistor M2 and the fourth thin film transistor M4 are N-type thin film transistors.

The first electrodes and second electrodes of the thin film transistors in the present embodiment can be sources or drains of the thin film transistors.

Figure 5:
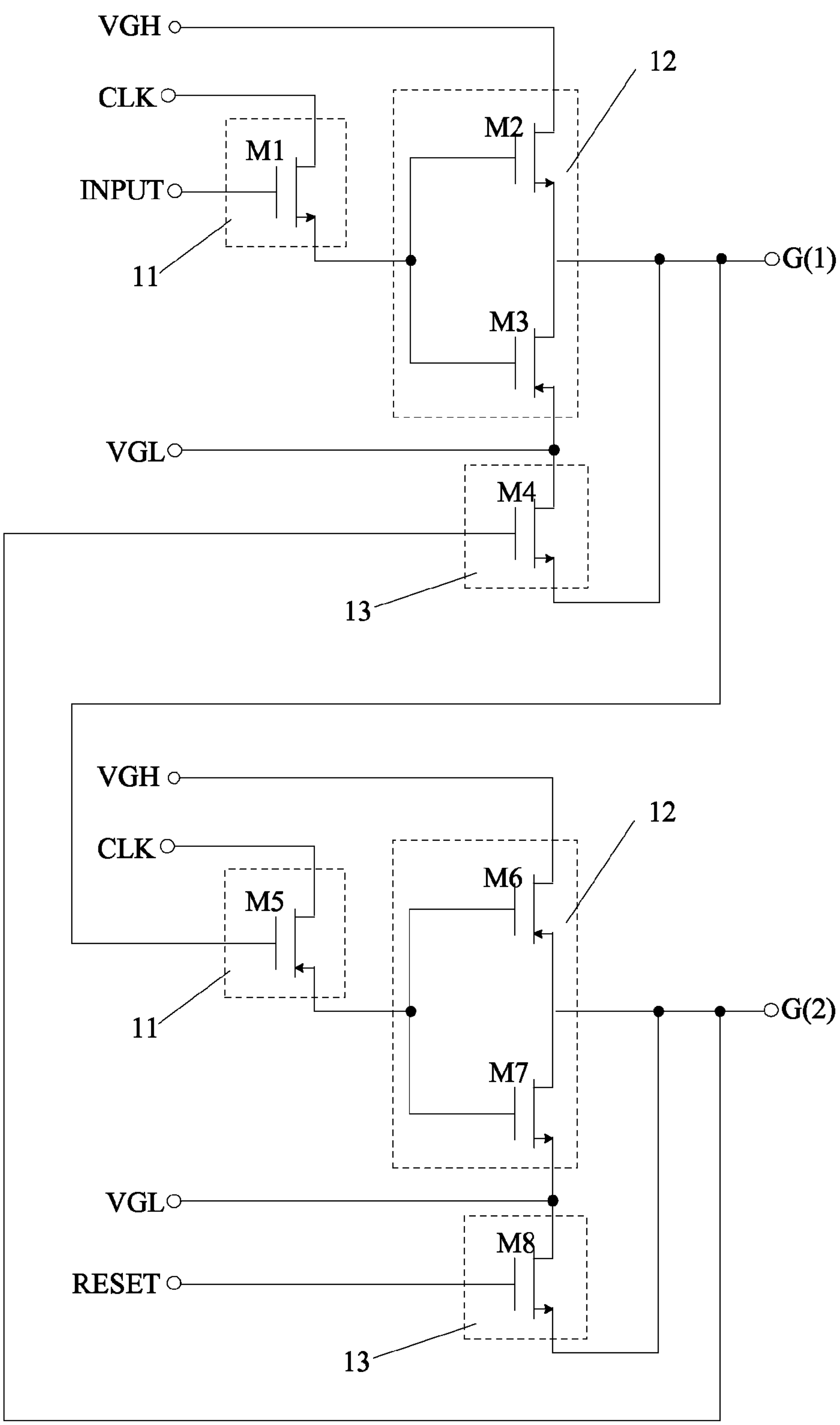
FIG. 5 is a schematic diagram of a circuit of a GOA unit of a fifth embodiment of the present disclosure.

FIG. 5 is a schematic diagram of a circuit of a GOA unit of the fifth embodiment of the present disclosure. As shown in FIG. 5, the circuit comprises first and second stages of GOA units. In the fifth embodiment, the first and second stages of GOA units comprise the control module 11, the output module 12 and the reset module 13 respectively. Herein, the control module 11 of the first stage of gate drive on array unit comprises the first thin film transistor M1, the output module 12 thereof comprises the second thin film transistor M2 and the third thin film transistor M3, and the reset module 13 thereof comprises the fourth thin film transistor M4. The control module 11 of the second stage of gate drive on array unit comprises a fifth thin film transistor M5, the output module thereof comprises a sixth thin film transistor M6 and a seventh thin film transistor M7, and the reset module 13 thereof comprises an eighth thin film transistor M8.

In the present embodiment, a gate of the first thin film transistor M1 is connected to the signal input terminal INPUT; a first electrode of the first thin film transistor M1 is connected to the clock signal input terminal CLK, and a second electrode of the first thin film transistor M1 is connected to a gate of the second thin film transistor M2 and a gate of the third thin film transistor M3;

A first electrode of the second thin film transistor M2 is connected to the high level signal terminal VGH, and a second electrode of the second thin film transistor M2 is connected to a first electrode of the third thin film transistor M3 and an output terminal G(1) of the gate driving signal of the present stage respectively.

A second electrode of the third thin film transistor M3 is connected to the low level signal terminal VGL and a first electrode of the fourth thin film transistor M4 respectively.

A gate of the fourth thin film transistor M4 is connected to an output terminal G(2) of a gate driving signal of a second stage, and a second electrode of the fourth thin film transistor M4 is connected to the output terminal G(1) of a gate driving signal of a first stage.

A gate of the fifth thin film transistor M5 is connected to the output terminal G(1) of the gate driving signal of the first stage, a first electrode of the fifth thin film transistor M5 is connected to the clock signal input terminal CLK, and a second electrode of the fifth thin film transistor M5 is connected to a gate of the sixth thin film transistor M6 and a gate of the seventh thin film transistor M7 respectively.

A first electrode of the sixth thin film transistor M6 is connected to the high level signal terminal VGH, and a second electrode of the sixth thin film transistor M6 is connected to a first electrode of the seventh thin film transistor M7 and the output terminal G(2) of the gate driving signal of the second stage respectively.

A second electrode of the seventh thin film transistor M7 is connected to the low level signal terminal VGL and a first electrode of the eighth thin film transistor M8 respectively.

A gate of the eighth thin film transistor M8 is connected to the reset terminal RESET which is connected to an output terminal G(3) of a gate driving signal of a third stage, and a second electrode of the eighth thin film transistor M8 is connected to the output terminal G(2) of the gate driving signal of the second stage.

As an example, the first thin film transistor M1, the second thin film transistor M2, the fourth thin film transistor M4, the seventh thin film transistor M7, and the eighth thin film transistor M8 are N-type thin film transistors; the third thin film transistor M3, the fifth thin film transistor M5, and the sixth thin film transistor M6 are P-type thin film transistors.

The first electrodes and second electrodes of the thin film transistors in the present embodiment can be sources or drains of the thin film transistors.

Figure 6:
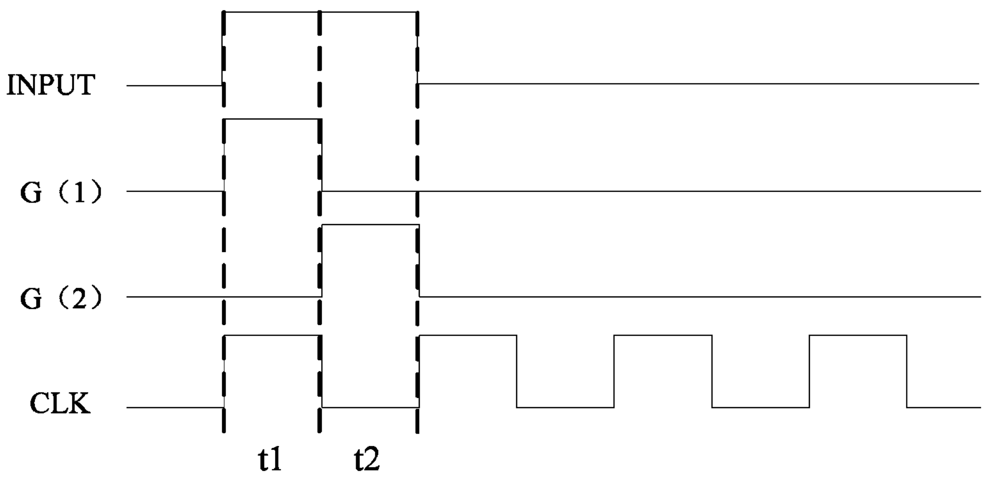
FIG. 6 is a schematic diagram of timing of respective signals when the GOA unit of the fifth embodiment of the present disclosure operates.

FIG. 6 is a schematic diagram of timing of respective signals when the GOA unit of the fifth embodiment of the present disclosure operates. According to the timing diagram as shown in FIG. 6, by taking the first stage of gate drive on array unit as an example, the operation process of the gate drive on array unit is divided into an output signal phase t1 and a reset phase t2.

In the output signal phase t1, an input INPUT is at a high level. Since the first thin film transistor M1 is the N-type thin film transistor, M1 is turned on. At this time, the clock signal CLK is also at the high level. Since the second thin film transistor M2 is the N-type thin film transistor and the third thin film transistor M3 is the P-type thin film transistor, M2 is turned on and M3 is stilled off. At this time, G(1) outputs the high level.

In the reset phase t2, the clock signal CLK is at a low level, and then the second thin film transistor M2 is turned off and the third thin film transistor M3 is turned on. At this time, the output terminal G(1) outputs the low level. Since the output terminal G(1) is connected to the gate of the fifth thin film transistor M5 and the fifth thin film transistor M5 and the sixth thin film transistor M6 are P-type thin film transistors, M5 is turned on, and since the clock signal CLK is at the low level at this time, M6 is turned on. At this time, the output terminal G(2) outputs the high level; since G(2) is connected to the gate of the fourth thin film transistor M4 and M4 is the N-type thin film transistor, M4 is turned on and the output terminal G(1) is maintained to output the low level thereby completing the reset operation on the output terminal G(1).

Figure 7:
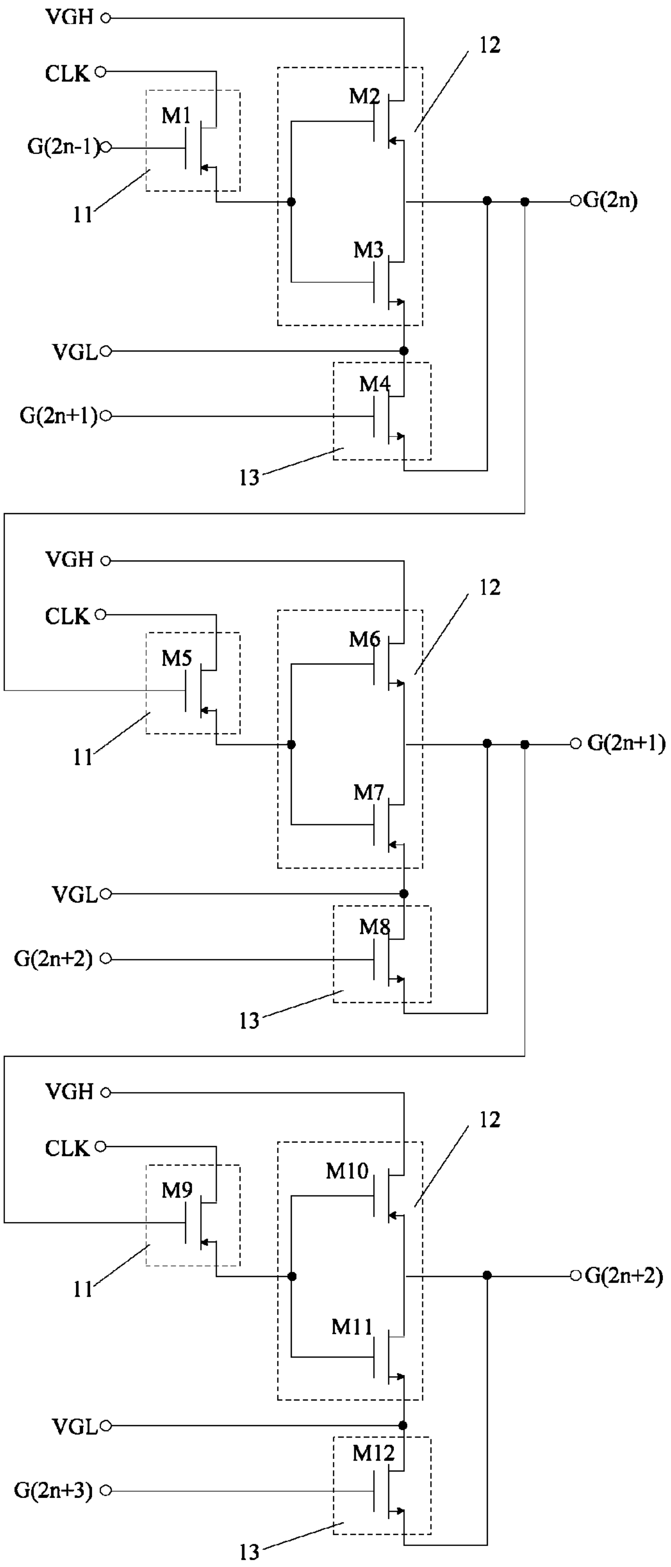
FIG. 7 is a schematic diagram of a circuit of a GOA unit of a sixth embodiment of the present disclosure.

FIG. 7 is a schematic diagram of a circuit of a GOA unit of a sixth embodiment of the present disclosure. As shown in FIG. 7, the circuit comprises the (2n)-th, the (2n+1)-th, and the (2n+2)-th stages of gate drive on array units. In the sixth embodiment, the (2n)-th, the (2n+1)-th, and the (2n+2)-th stages of gate drive on array units comprise the control module 11, the output module 12 and the reset module 13. Herein, the control module 11 of the (2n)-th stage of gate drive on array unit comprises the first thin film transistor M1, the output module 12 thereof comprises the second thin film transistor M2 and the third thin film transistor M3, and the reset module 13 thereof comprises the fourth thin film transistor M4; the control module 11 of the (2n+1)-th stage of gate drive on array unit comprises the fifth thin film transistor M5, the output module 12 thereof comprises the sixth thin film transistor M6 and the seventh thin film transistor M7, and the reset module 13 thereof comprises the eighth thin film transistor M8; the control module 11 of the (2n+2)-th stage of gate drive on array unit comprises a ninth thin film transistor M9, the output module 12 thereof comprises a tenth thin film transistor M10 and an eleventh thin film transistor M11, and the reset module 13 thereof comprises a twelfth thin film transistor M12.

In the present embodiment, a gate of the first thin film transistor M1 is connected to the output terminal G(2n−1) of the gate driving signal of the previous stage; a first electrode of the first thin film transistor M1 is connected to the clock signal input terminal CLK, and a second electrode of the first thin film transistor M1 is connected to a gate of the second thin film transistor M2 and a gate of the third thin film transistor M3.

A first electrode of the second thin film transistor M2 is connected to the high level signal terminal VGH, and a second electrode of the second thin film transistor M2 is connected to a first electrode of the third thin film transistor M3 and an output terminal G(2n) of the gate driving signal of the present stage respectively.

A second electrode of the third thin film transistor M3 is connected to the low level signal terminal VGL and a first electrode of the fourth thin film transistor M4 respectively.

A gate of the fourth thin film transistor M4 is connected to the output terminal G(2n+1) of the gate driving signal of the next stage, and a second electrode of the fourth thin film transistor M4 is connected to the output terminal G(n) of the gate driving signal of the present stage.

A gate of the fifth thin film transistor M5 is connected to the output terminal G(2n) of the gate driving signal of the previous stage, a first electrode of the fifth thin film transistor M5 is connected to the clock signal input terminal CLK, and a second electrode of the fifth thin film transistor M5 is connected to a gate of the sixth thin film transistor M6 and a gate of the seventh thin film transistor M7 respectively.

A first electrode of the sixth thin film transistor M6 is connected to the high level signal terminal VGH, and a second electrode of the sixth thin film transistor M6 is connected to a first electrode of the seventh thin film transistor M7 and the output terminal G(2n+1) of the gate driving signal of the present stage respectively.

A second electrode of the seventh thin film transistor M7 is connected to the low level signal terminal VGL and a first electrode of the eighth thin film transistor M8 respectively.

A gate of the eighth thin film transistor M8 is connected to an output terminal G(2n+2) of the gate driving signal of the next stage, and a second electrode of the eighth thin film transistor M8 is connected to the output terminal G(2n+1) of the gate driving signal of the present stage.

A gate of the ninth thin film transistor M9 is connected to the output terminal G(2n+1) of the gate driving signal of the previous stage, a first electrode of the ninth thin film transistor M9 is connected to the clock signal input terminal CLK, and a second electrode of the ninth thin film transistor M9 is connected to a gate of the tenth thin film transistor M10 and a gate of the eleventh thin film transistor M11 respectively;

A first electrode of the tenth thin film transistor M10 is connected to the high level signal terminal VGH, and a second electrode of the tenth thin film transistor M10 is connected to a first electrode of the eleventh thin film transistor M11 and the output terminal G(2n+2) of the gate driving signal of the present stage respectively;

A second electrode of the eleventh thin film transistor M11 is connected to the low level signal terminal VGL and a first electrode of the twelfth thin film transistor M12 respectively.

A gate of the twelfth thin film transistor M12 is connected to an output terminal G(2n+3) of the gate driving signal of the next stage, and a second electrode of the twelfth thin film transistor M12 is connected to the output terminal G(2n+2) of the gate driving signal of the present stage.

As an example, the first thin film transistor M1, the second thin film transistor M2, the fifth thin film transistor M5, the seventh thin film transistor M7, the ninth thin film transistor M9 and the tenth thin film transistor M10 are P-type thin film transistors; the third thin film transistor M3, the fourth thin film transistor M4, the sixth thin film transistor M6, the eighth thin film transistor M8, the eleventh thin film transistor M11 and the twelfth thin film transistor M12 are N-type thin film transistors.

Figure 8:
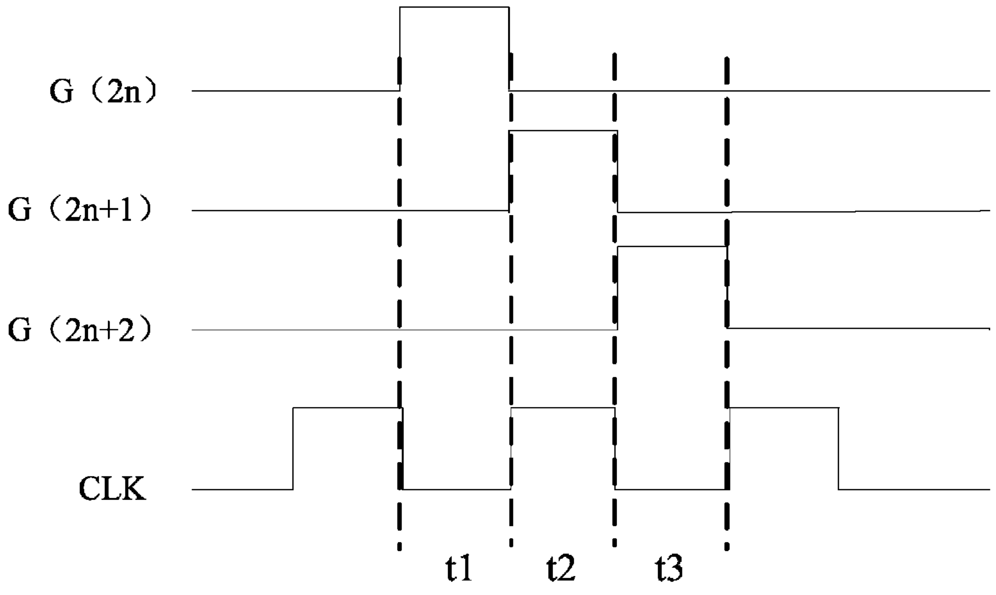
FIG. 8 is a schematic diagram of timing of respective signals when the GOA unit of the sixth embodiment of the present disclosure operates.

FIG. 8 is a schematic diagram of timing of respective signals when a GOA unit of a sixth embodiment of the present disclosure operates. According to the timing diagram as shown in FIG. 6, the operation process of the gate drive on array unit is divided into t1, t2, t3 phases, wherein the t1 phase is an output signal phase of the (2n)-th stage of gate drive on array unit, the t2 phase is an output signal phase of the (2n+1)-th stage of gate drive on array unit, and the t3 phase is an output signal phase of the (2n+2)-th stage of gate drive on array unit. Correspondingly, the output signal phase of each stage of gate drive on array unit is the reset phase of the previous stage of gate drive on array unit.

In the phase t1, since G(2n−1) is at the low level and the first thin film transistor M1 is the P-type thin film transistor, M1 is turned on. At this time, the clock signal CLK is at the low level. Since the second thin film transistor M2 is the P-type thin film transistor and the third thin film transistor M3 is the N-type thin film transistor, M2 is turned on and M3 is stilled off. At this time, G(2n) outputs the high level.

In the phase t2, the clock signal CLK is at the high level, and then the second thin film transistor M2 is turned off and the third thin film transistor M3 is turned on. At this time, G(2n) outputs the low level. Since G(2n) is connected to the gate of the fifth thin film transistor M5 and the fifth thin film transistor M5 is the P-type thin film transistors, M5 is turned on, and since the clock signal CLK is at the high level at this time, and the sixth thin film transistor M6 is the N-type thin film transistor and the seventh thin film transistor M7 is the P-type thin film transistor, M6 is turned on, M7 is turned off, and the output terminal G(2n+1) outputs the high level; since G(2n+1) is connected to the gate of the fourth thin film transistor M4 and M4 is the N-type thin film transistor, M4 is turned on and G(2n) is maintained to output the low level, thereby completing the reset operation on G(2n).

In the phase t3, the clock signal CLK is at the low level, and then M6 is turned off and M7 is turned on. At this time, G(2n+1) outputs the low level. Since G(2n+1) is connected to the gate of the ninth thin film transistor M9 and M9 is the P-type thin film transistor, M9 is turned on, and since CLK is at the low level at this time, the tenth thin film transistor M10 is the P-type thin film transistor, and the eleventh thin film transistor M11 is the N-type thin film transistor, M9 is turned on, M10 is turned off, and G(2n+2) outputs the high level; since G(2n+2) is connected to the gate of the eighth thin film transistor M8 and M8 is the N-type thin film transistor, M8 is turned on. G(2n+1) is maintained to output the low level thereby completing the reset operation on G(2n+1).

Based on the above gate drive on array unit, there further provides in embodiments of the present disclosure an gate drive on array circuit comprising more than one gate drive on array unit as described above; and except the first stage of gate drive on array unit, the signal input terminal of each stage of gate drive on array unit is connected to the output terminal of the gate driving signal of the previous stage of gate drive on array unit;

except the last stage of gate drive on array unit, the reset terminal of each stage of gate drive on array unit is connected to the output terminal of the gate driving signal of the next stage of gate drive on array unit.

There is also disclosed herein a display device of the embodiments of the present disclosure. The display device comprises the above display panel. The display device may be any product or elements having the displaying function, such as a liquid crystal panel, an electronic paper, an OLED panel, a liquid crystal TV, a liquid crystal display, a digital photo frame, a mobile phone and a tablet computer and the like.

The above descriptions are just exemplary embodiments of the present disclosure and not used to limit the protection scope of the present disclosure. Any amendments, equivalent replacements, improvements and so on made within the spirit and scope of the present disclosure are included in the protection scope of the present disclosure.

What is claimed is:

1. A gate drive on array unit, comprising:

a control module having a first input terminal that receives a gate driving signal of a previous stage of the gate drive on array unit or a start input signal, and a second input terminal that receives a periodic clock signal which has a fixed period, configured to output the periodic clock signal under control of the gate driving signal of the previous stage of the gate drive on array unit or the start input signal received by the first input terminal of the control module;

an output module having a first input terminal connected to the control module, a second input terminal connected to a high voltage signal terminal, and a third input terminal connected to a low voltage signal terminal, the output module configured to output a high voltage signal received by the high voltage signal terminal as a gate driving signal of a present stage under control of the periodic clock signal outputted from the control module and output a low voltage signal received by the low voltage signal terminal under the control of the periodic clock signal outputted from the control module; and a reset module connected to the output module and configured to reset the gate driving signal of the present stage under control of a gate driving signal of a next stage of the gate drive on array unit, wherein the control module comprises a first thin film transistor, wherein the output module comprises a second thin film transistor and a third thin film transistor, wherein the reset module comprises a fourth thin film transistor, wherein a gate of the first thin film transistor is connected to an output terminal of the gate driving signal of the previous stage of the gate drive on array unit or the start input signal, a first electrode of the first thin film transistor is connected to a clock signal input terminal, and a second electrode of the first thin film transistor is connected to a gate of the second thin film transistor and a gate of the third thin film transistor, wherein a first electrode of the second thin film transistor is connected to a high level output terminal, and a second electrode of the second thin film transistor is connected to a first electrode of the third thin film transistor and an output terminal of the gate driving signal of the present stage, wherein a second electrode of the third thin film transistor is connected to a low level output terminal and a first electrode of the fourth thin film transistor, wherein a gate of the fourth thin film transistor is connected to an output terminal of the gate driving signal of the next stage of the gate drive on array unit, and a second electrode of the fourth thin film transistor is connected to the output terminal of the gate driving signal of the present stage, wherein the first thin film transistor of a first stage of the gate drive on array unit is a N-type thin film transistor, and except the first stage of the gate drive on array unit, the first thin film transistor of other stages of the gate drive on array unit is a P-type thin film transistor, and wherein the second thin film transistor and the fourth thin film transistor of a first stage of the gate drive on array unit are N-type thin film transistors; and wherein the third thin film transistor thereof is a P-type thin film transistor.

2. The gate drive on array unit according to claim 1, wherein, except the first stage of the gate drive on array unit, the third thin film transistor of odd stages of the gate drive on array unit is a P-type thin film transistor, and the second thin film transistor and the fourth thin film transistor thereof are N-type thin film transistors; and the second thin film transistor of even stages of the gate drive on array unit is a P-type thin film transistors, and the third thin film transistor and the fourth thin film transistor thereof are N-type thin film transistors.

3. A gate drive on array circuit, comprising a plurality of the gate drive on array units according to claim 1, wherein except a first stage of the gate drive on array unit, a signal input terminal of each stage of the gate drive on array unit is connected to an output terminal of the gate driving signal of the previous stage of the gate drive on array unit; and except a last stage of the gate drive on array unit, a reset terminal of each stage of the gate drive on array unit is connected to an output terminal of the gate driving signal of the next stage of the gate drive on array unit.

4. A display apparatus, comprising the gate drive on array circuit according to claim 3.

5. The display apparatus according to claim 4, wherein the second thin film transistor and the fourth thin film transistor of the first stage of the gate drive on array unit are N-type thin film transistors, and the third thin film transistor thereof is a P-type thin film transistor.

6. The display apparatus according to claim 5, wherein, except the first stage of the gate drive on array unit, the third thin film transistor of odd stages of the gate drive on array units is a P-type thin film transistors, and the second thin film transistor and the fourth thin film transistor thereof are N-type thin film transistors; and the second thin film transistor of even stages of the gate drive on array units is a P-type thin film transistors, and the third thin film transistor and the fourth thin film transistor thereof are N-type thin film transistors.

7. The gate drive on array circuit according to claim 3, wherein, except the first stage of the gate drive on array unit, the third thin film transistor of odd stages of the gate drive on array units is a P-type thin film transistors, and the second thin film transistor and the fourth thin film transistor thereof are N-type thin film transistors; and the second thin film transistor of even stages of the gate drive on array units is a P-type thin film transistors, and the third thin film transistor and the fourth thin film transistor thereof are N-type thin film transistors.

* * * * *